United States Patent Office 3,787,448
Patented Jan. 22, 1974

3,787,448
10-OXAPROSTANOIC ACID DERIVATIVES
Junichi Himizu, Urawa, Shoichi Harigaya, Kawasaki, Akihiko Ishida, Ageo, Kaoru Yoshikawa, Omiya, and Masanori Sato, Kuki, Japan, assignors to Tanabe Seiyaku Co., Ltd., Osaka, Japan
No Drawing. Filed June 8, 1972, Ser. No. 260,963
Claims priority, application Japan, June 15, 1971, 46/42,722
Int. Cl. C07d 5/06
U.S. Cl. 260—343.6
11 Claims

ABSTRACT OF THE DISCLOSURE

Lower - alkyl 7 - (4β-formyl-oxolane-2-one-3α-yl)-heptanoate is condensed with 2-oxo-heptylene triphenyl phosphate or di-lower-alkyl 2-oxo-heptyl-phosphate. Lower-alkyl 9,15-dioxo-13,14-didehydro-10-oxaprostanoate (A) thus obtained is hydrogenated to give lower-alkyl 9,15-dioxo-10-oxaprostanoate (B) in the presence of a catalyst (e.g., palladium, palladium-carbon). The resultant compound (A) or (B) is further reduced with a metal borohydride to give lower-alkyl 9-oxo-13,14-didehydro-15-hydroxy-10-oxaprostanoate (D) or lower-alkyl 9-oxo-15-hydroxy-10-oxaprostanoate (C), followed by optional acylation of the compound (D) to give lower-alkyl 9-oxo-13,14-didehydro-15-acyloxy-10-oxaprostanoate (G). Furthermore, 9-oxo-15-hydroxy-10-oxaprostanoic acid (E) or 9 - oxo - 13,14-didehydro-15-hydroxy-10-oxaprostanoic acid (F) is prepared by hydrolyzing the compound (C) or (D). The 10-oxaprostanoic acid derivatives (A), (B), (C), (D), (E), (F) and (G) are all useful for treatment of gastro-intestinal dissorders, blood pressure disorders and as stimulating agents for childbirth, abortion and labor.

This invention relates to novel 10-oxaprostanoic acid derivaties and a process for preparing same. More particularly, it relates to the derivatives of the following formula:

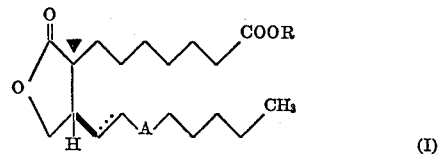

(I)

wherein R is hydrogen or lower alkyl, the dotted line is an optional double bond and A is a radical having the formula: >CO, >CHOH or >CHOCOR¹, wherein R¹ is lower alkyl.

The 10-oxaprostanoic acid derivatives (I) of the present invention show various therapeutic activities similar to prostaglandin. Said derivatives are useful for treatment of gastro-intestinal disorders, blood pressure disorders and they are also useful as stimulating agents for childbirth, abortion and labor. For example, methyl 15(S)-hydroxy-9-oxo-13,14-didehydro(trans) - 10 - oxa - prostanoate and 15(S)-hydroxy-9-oxo-13,14-didehydro(trans)-10-oxaprostanoic acid, when used at the concentration of $10^{-8}$ g./ml., shows potent contractile activity on isolated guinea-pig ileum which was suspended in Tyrodes solution. 15(S) - hydroxy - 9-oxo-13,14-didehydro(trans)-10-oxaprostanoic acid, when used at the concentration of $10^{-7}$ g./ml., also shows potent contractile activity on the iso-lated uterus of diestrous rat. Moreover, when the intestinal motility of mice is measured in accordance with Van Liere's method (The Journal of Pharmacology and Experimental Therapeutics, 103 (1951), 187), 15(R)-hydroxy-9-oxo-13,14 - didehydro(trans) - 10 - oxaprostanoic acid and 15(S)-hydroxy-9-oxo-13,14-didehydro(trans)-10-oxaprostanoic acid at the dose of 1 mg./kg. (i.p.) increase the propulsive motility of the intestine about 1.5 times greater than that of control groups.

The toxicity of the 10-oxaprostanoic acid derivatives (I) of the present invention is considerably low. For example, no detrimental effect is observed when the oxapostanoic acid derivatives (I) are injected intraperitoneally into mice at a dose of 300 mg./kg.

According to the present invention, the 10-oxaprostanoic acid derivatives (I) can be prepared from lower-alkyl 7-(4β-formyl-oxolane-2-one-3α-yl)-heptanoate (II), as shown in the following reaction scheme:

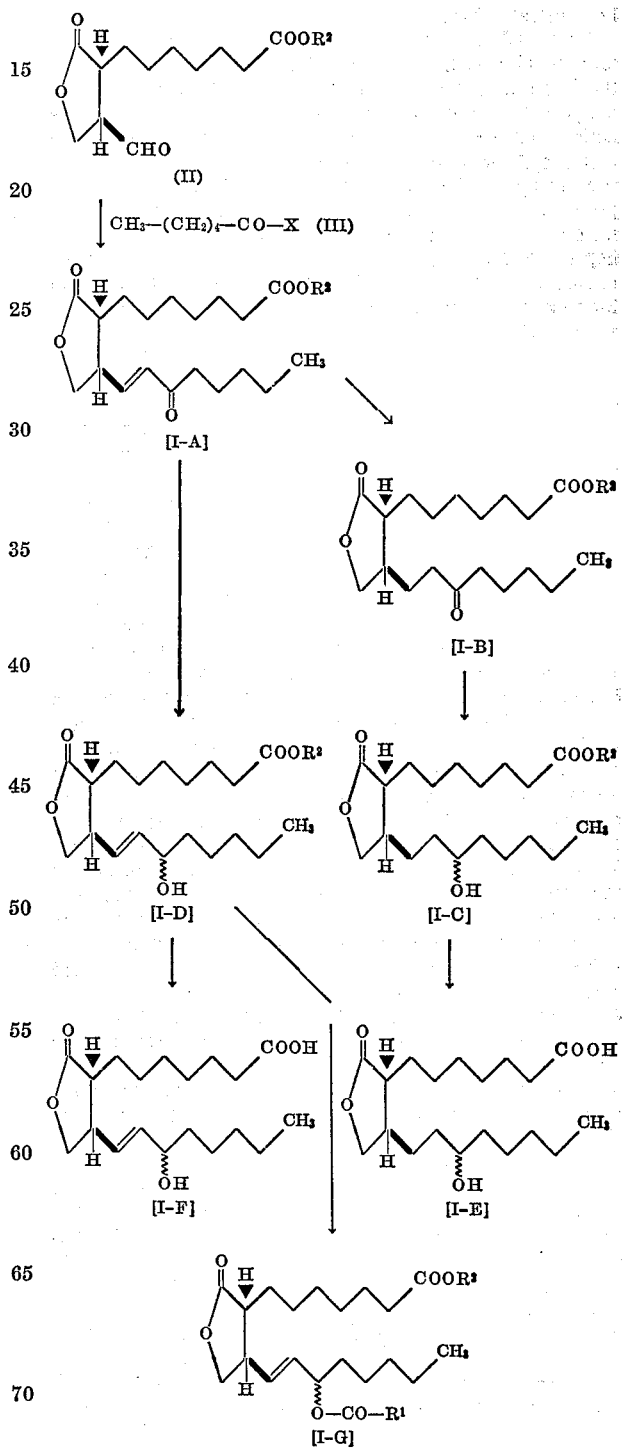

wherein $R^1$ is same as defined above, $R^2$ is lower alkyl, and X is a radical having the formula:

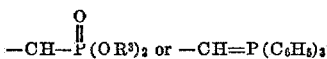

wherein $R^3$ is lower alkyl.

In the above reaction scheme, it should be noted that the 10-oxaprostanoic acid derivatives of the Formulas I–A, I–B, I–C, I–D, I–E, I–F and I–G are all included within the objective products of the present invention. Moreover, the terminology "lower alkyl" referred to in the present invention represents an alkyl radical having one to five carbon atoms, such as methyl, ethyl, propyl, butyl or pentyl.

The above-described reactions of the invention will be illustrated hereinafter.

Lower-alkyl 7 - (4β - formyl-oxolane-2-one-3α-yl)-heptanoate (II) is first condensed with a Wittig reagent of the Formula III to give lower-alkyl 9,15-dioxo-13,14-didehydro-10-oxaprostanoate (I–A). The condensation reaction may be accomplished in the presence of an alkali metal hydride (e.g., lithium hydride, potassium hydride, sodium hydride) in a solvent (e.g., diethoxyethane). It is preferred to carry out the reaction in an inert gas (e.g., nitrogen atmosphere) and at room temperature. 2-oxoheptylene triphenyl phosphate, dimethyl 2-oxo-heptylphosphate, diethyl 2-oxo-heptyl-phosphate and dipropyl 2-oxoheptyl-phosphate are exemplified as the Wittig reagent (III).

The hydrogenation of the resultant Compound I-A in the presence of such a catalyst as palladium or palladium-carbon gives lower-alkyl 9,15-dioxo-10-oxaprostanoate (I–B). It is preferred to carry out the reaction at room temperature. Ethyl acetate, methanol, ethanol, benzene and n-hexane are suitable as the reaction solvent. The hydrogenation may be effected either at an atmospheric pressure or under an elevated pressure.

Lower-alkyl 9-oxo-13,14-didehydro-15-hydroxy-10-oxaprostanoate (I–D) or lower-alkyl 9-oxo-15-hydroxy-10-oxaprostanoate (I–C) can be prepared, respectively, by reducing the Compound I–A or I–B with a metal borohydride. The reduction may be effected at 10° to —20° C. Lithium borohydride, potassium borohydride, sodium borohydride and zinc borohydride are employed as the metal borohydride. Absolute methanol and absolute ethanol are suitable as the reaction solvent. Alternatively, the reduction of the Compound I–B to the corresponding 15-hydroxy-oxaprostanoate Compound I–C is conducted by treating the Compound I–B with hydrogen in the presence of such a catalyst as platinum or platinum dioxide. In this alternative method, it is preferred to carry out the reaction at room temperature. Absolute methanol and absolute ethanol are suitable as the reaction solvent. The reduction of this alternative method may be carried out either at an atmospheric pressure or under an elevated pressure. Each one of the 15-hydroxy-oxaprostanoate Compounds I–D and I–C thus obtained consists of two stereoisomers which are different to each other in their steric configuration of the hydroxy radical attached at 15th-position thereof. However, these stereoisomers are readily separated by their difference in solubility or by silica-gel chromatography.

9-oxo-13,14-didehydro-15-hydroxy - 10 - oxaprostanoic acid (I–F) and 9-oxo-15-hydroxy-10-oxaprostanoic acid (I–E) are prepared, respectively, by hydrolyzing the above-mentioned Compounds I–D and I–C. The hydrolysis may be accomplished in a conventional manner such as, for example, by treatment with a mineral acid (e.g., hydrochloric acid, sulfuric acid) or an alkali metal hydroxide (e.g., sodium hydroxide, potassium hydroxide). It is suitable to carry out the reaction of 10° to 30° C.

Furthermore, the acylation of the Compound I–D with a lower-aliphatic acylating agent gives lower-alkyl-9-oxo-13,14-didehydro-15-acyloxy - 10 - oxaprostanoate I–G. A lower-aliphatic acyl anhydride (e.g., acetic acid anhydride, propionic acid anhydride) and a lower-aliphatic acyl halide (e.g., acetyl bromide, propionyl chloride, butyryl chloride) are employed as the acylating agent. It is preferred to carry out the reaction at room temperature in the presence of an excess amount of an organic base such as pyridine or triethylamine.

The starting compounds of the present invention, i.e., lower-alkyl 7 - (4β-formyl-oxolane-2-one-3α-yl)-heptanoate, are also novel compounds. Practical methods of preparation of these compounds may be illustratively shown by the following reaction scheme:

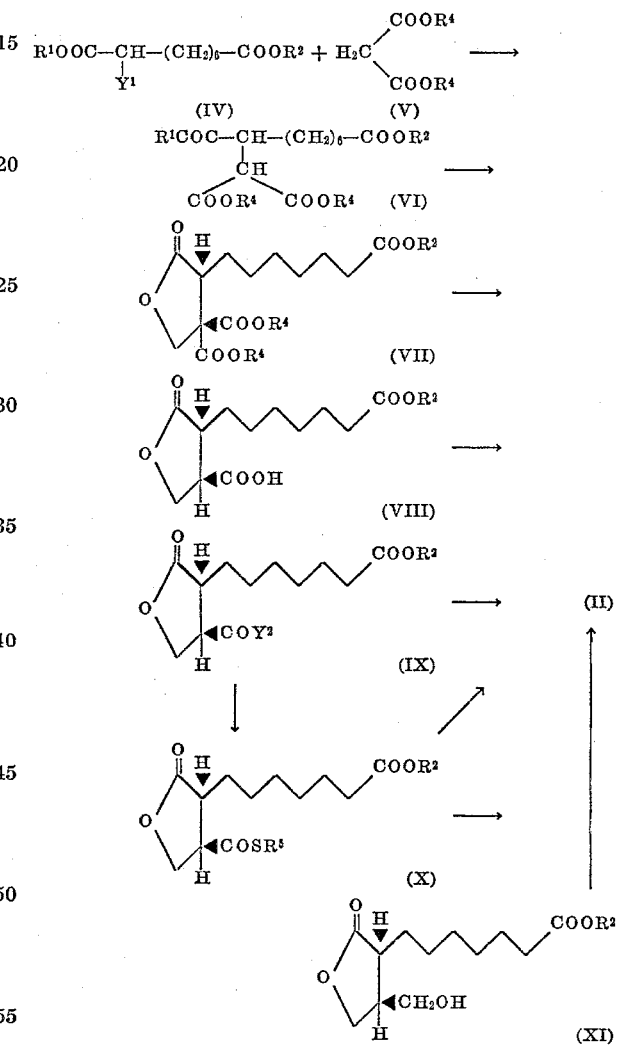

wherein $R^4$ is an ester residue, $R^5$ is an alkyl, $Y^1$ and $Y^2$ are halogen and $R^2$ is same as defined above.

In the above-mentioned scheme, the condensation reaction of lower-alkyl α-halogeno-azelainate (IV) with malonic acid diester (V) is accomplished in the presence of a base such as alkali metal hydride (e.g., lithium hydride, potassium hydride, sodium hydride) or alkali metal alkoxide (e.g., sodium methylate, potassium methylate, sodium ethylate, potassium ethylate, sodium tert.-butylate, potassium tert.-butylate). The reaction may be preferably carried out at room temperature in nitrogen atmosphere. Dimethylformamide and 1,2-dimethoxyethane are suitable as the reaction solvent.

The resultant 8,9,9-tricarboxy-pelargonate Compound VI is then reacted with paraformaldehyde in the presence of an alkali metal alkoxide (e.g., sodium methylate, potassium methylate, sodium ethylate, potassium tert.-butylate) in a solvent (e.g., methanol, ethanol, propanol, tert.-butanol). It is preferred to carry out at room temperature.

The 7 - (4α,4β - dicarboxy-oxolane-2-one-3α-yl)-heptanoate (VII) thus obtained is heated to induce decarboxylation at 150° to 170° C., and the resultant 7-(4β-carboxy-oxolane-2-one-3α-yl)-heptanoate (VIII) is then reacted with an excess amount of thionyl halide (e.g., thionyl chloride) to give 7-(4β-halocarbonyl-oxolane-2-one-3α-yl)-heptanoate (IX) at 50° to 80° C.

Lower-alkyl 7-(4β-formyl-oxolane - 2 - one-3α-yl)-heptanoate (II) is obtained by hydrogenating the Compound IX in the presence of such a catalyst as palladium or palladium sulfate in a solvent. Benzene, toluene, xylene and n-hexane are suitable as the solvent. The hydrogenation may be carried out either at an atmospheric pressure or under an elevated pressure. The Compound II may also be obtained by reacting the Compound IX with an alkyl mercaptane (e.g., methylmercaptane, ethylmercaptane, propylmercaptane, butylmercaptane) in the presence of an organic base (e.g., pyridine) to give lower-alkyl 7-(4β-alkylthiocarbonyl-oxolane - 2 - one-3α-yl)-heptanoate (X), and then reducing the Compound X with an inactivated Raney nickel (cf. Journal of the American Chemical Society 70 (1948), 1907) in a solvent such as methanol, ethanol or ether. Alternatively, the Compound II is prepared by reducing the Compound X with Raney nickel in a solvent (e.g., methanol, ethanol, ether) to give lower-alkyl 7-(4β - hydroxymethyl-oxolane-2-one-3α-yl)-heptanoate (XI), and then oxidating the Compound XI with dicyclohexylcarbodiimide in the presence of a mixture such as, for example, dimethylsulfoxide-pyridine-trifluoroacetic acid, dimethylsulfoxide-pyridine-phosphoric acid, or dimethylsulfoxide-phosphoric acid in a solvent (e.g., benzene).

The 10-oxaprostanoic acid derivatives (I) of the present invention may be incorporated within a pharmaceutical preparation in conjunction with or admixed with a pharmaceutical excipient that is suitable for enteral or parenteral administration. Excipients which do not react with the 10-oxaprostanoic acid derivatives (I) should be selected. Gelatin, lactose, glucose, sodium chloride, starch, magnesium stearate, talcum, vegetable oil, benzyl alcohol, gums are suitable. Other known medicinal excipients may be employed. The pharmaceutical preparation may be, for example, a solid dosage form such as a tablet, a coated tablet, a pill, or a capsule; or in a liquid dosage form such as, for example, a solution, a suspension or an emulsion. The pharmaceutical preparation may be sterilized and/or may contain auxiliaries, such as preserving, stabilizing, wetting or emulsifying agents. The pharmaceutical preparation may further contain other therapeutically valuable substances.

Practical and presently preferred embodiments of the present invention will be illustrated in the following examples.

EXAMPLE 1

(Preparation of the starting compound)

(A) 10 g. of di-tert.-butyl malonate are added dropwise to a mixture of 1.24 g. of 63% sodium hydride and 70 ml. of dimethylformamide in nitrogen atmosphere under ice-cooling and stirring. After 14.5 g. of dimethyl α-bromoazelainate is added dropwise to the mixture, the mixture is stirred at room temperature for 24 hours. The mixture is poured into ice-water. The aqueous mixture is neutralized with acetic acid. Then, the aqueous mixture is alkalified with sodium bicarbonate and extracted with ether. The ether extract is washed with water, dried and then evaporated to remove solvent. The oily residue thus obtained is distilled in the presence of magnesium oxide under reduced pressure. 9.2 g. of methyl 8-methoxycarbonyl - 9,9 - di-(tert.-butoxycarbonyl)-pelargonate are obtained as an oil. B.P. 180–190° C./1 mm. Hg.

(B) A mixture of 5.0 g. of methyl 8-methoxycarbonyl-9,9-di-(tert.-butoxycarbonyl)pelargonate, 9.5 ml. of absolute methanol and 1.05 g. of paraformaldehyde is heated at 50° C., and sodium methylate prepared from 8 mg. of metal sodium and 1.4 ml. of absolute methanol is added thereto under stirring. The mixture is stirred at the same temperature for 4 hours. Then, the mixture is poured into ice-water containing acetic acid. The aqueous mixture is alkalified with sodium bicarbonate and extracted with ether. The ether extract is washed with water, dried and then evaporated to remove solvent. 4.7 g. of methyl 7-[4α,4β-di-(tert.-butoxycarbonyl)-oxolane-2-one-3α-yl]-heptanoate are obtained as an oil.

Infrared absorption spectrum:

$\gamma_{max.}^{liq.}$ cm.$^{-1}$: 1780 (lactone), 1720 (ester)

(C) 4.7 g. of methyl 7-[4α,4β-di-(tert.-butoxycarbonyl)-oxolane-2-one-3α-yl]-heptanoate are heated at 150°–170° C. under reduced pressure, and then ether are added thereto. The ether solution is extracted with an aqueous sodium bicarbonate solution. The aqueous extract is acidified with hydrochloric acid. After adding ammonium sulfate, the acidic solution is extracted with ether. The ether extract is dried and then evaporated to remove solvent. The oily residue thus obtained is distilled under reduced pressure. The distilled oil is allowed to stand at room temperature. 1.81 g. of methyl 7-(4β-carboxy-oxolane-2-one-3α-yl)-heptanoate are obtained at crystals. M.P. 68°–70° C. B.P. 205°–210° C./6 mm. Hg.

(D) A mixture of 3.26 g. of methyl 7-(4β-carboxy-oxolane-2-one - 3α - yl)-heptanoate and 10 ml. of thionyl chloride is heated at 80° C. for 7 hours. The reaction mixture is evaporated to remove the excess amount of thionyl chloride under reduced pressure. 5 ml. of absolute benzene are added to the oily residue, and then benzene is removed by evaporation. (This treatment is repeated three times.) 3.30 g. of methyl 7-(4-β-chlorocarbonyl-oxolane - 2 - one-3α-yl)-heptanoate are obtained as an oil.

Infrared absorption spectrum:

$\gamma_{max.}^{liq.}$ cm.$^{-1}$: 1780 (COCl), 1770 (lactone), 1720 (ester)

(E) Dry hydrogen gas is introduced into a mixture of 0.317 g. of methyl 7-(4β-chlorocarbonyl-oxolane-2-one-3α-yl)-heptanoate, 10 ml. of absolute benzene and 0.091 g. of 5% palladium-barium sulfate for 6 hours under stirring. After the reaction is completed, the catalysts are removed by filtration. The filtrate is washed with water and then evaporated to remove solvent. 0.30 g. of methyl 7-(4β-formyl-oxolane-2-one-3α-yl)-heptanoate is obtained as an oil. 2,4-dinitrophenylhydrazone derivative of this product melts at 130° to 131° C.

Infrared absorption spectrum:

$\gamma_{max.}^{liquid\ paraffine}$ cm.$^{-1}$: 1770 (lactone), 1720 (ester)

EXAMPLE 2

(Preparation of the starting compound)

(A) 3.4 g. of methyl 7-(4β-chlorocarbonyl-oxolane-2-one-3-yl)-heptanoate are added to a mixture of 16 ml. of pyridine and 4 ml. of ethyl mercaptane under ice-cooling and stirring. The mixture is allowed to stand over-night and then poured into ice-water. The aqueous mixture is extracted with ether. The ether extract is washed with diluted hydrochloric acid, water, aqueous sodium bicarbonate solution and water, successively. Then, the extract is dried and evaporated to remove solvent. 3.62 g. of methyl 7-(4β-ethylthiocarbonyl-oxolane-2-one - 3α - yl)-heptanoate are obtained as an oil.

Infrared absorption spectrum:

$\gamma_{max.}^{liq.}$ cm.$^{-1}$: 1780 (lactone), 1725 (ester), 1960 (thioester)

(B) One ml. of inactivated Raney nickel is added to a mixture of 0.289 g. of methyl 7(4β-ethylthiocarbonyl-oxolane-2-one-3α-yl)-heptanoate and 5 ml. of ether under ice-cooling and stirring. The mixture is stirred at room temperature for 15 minutes. Then, the mixture is filtered to remove catalyst. The filtrate is washed with water, and evaporated to remove solvent. 0.215 g. of methyl 7-(4β-formyloxolane-2-one-3α-yl)-heptanoate is obtained as an oil. 2,4-dinitrophenylhydrazine derivative of this product melts at 130°–131° C.

EXAMPLE 3

(Preparation of the starting compound)

(A) 10.83 g. of methyl 7-(4β-ethylthiocarbonyl-oxolane-2-one-3α-yl)-heptanoate are added to a mixture of 50 ml. of absolute ether and 50 ml. of Raney nickel under stirring. The mixture is stirred at room temperature for one hour. Then, the mixture is filtered to remove catalyst. The filtrate is washed with a mixture of ether and methanol, and evaporated to remove solvent. The oily residue thus obtained is distilled under reduced pressure. 6.58 g. of methyl 7-(4β-hydroxymethyl-oxolane-2-one-3α-yl)-heptanoate are obtained. B.P. 187°–190° C./0.5 mm. Hg.

(B) 13.91 g. of dicyclohexylcarbodiimide are added to a mixture of 5.82 g. of methyl 7-(4β - hydroxymethyl-oxolane-2-one-3α-yl)-heptanoate, 70 ml. of dimethylsulfoxide, 70 ml. of benzene and 1.81 ml. of pyridine under ice-cooling and stirring. The mixture is stirred at room temperature for 3 days. 5.51 g. of oxalic acid are added to the mixture under ice-cooling, and the mixture is further stirred for 30 minutes. Insoluble materials are removed by filtration. The filtrate is washed with ether. After adding an aqueous sodium bicarbonate solution, the filtrate is extracted with ether. The ether extract is washed with water, dried and then evaporated to remove solvent. 3.92 g. of methyl 7-(4β-formyl-oxolane-2-one - 3α - yl)-heptanoate are obtained as an oil. 2,4-dinitrophenylhydrazine derivative of this product melts at 130°–131° C.

EXAMPLE 4

A solution of 0.191 g. of dimethyl 2-oxo-heptylphosphate in 2 ml. of 1,2-dimethoxyethane is added to a mixture of 0.038 g. of 63% sodium hydride and 3 ml. of 1,2-dimethoxyethane in nitrogen atmosphere under stirring. A mixture of 0.3 g. of methyl 7-(4β-formyl-oxolane-2-one-3α-yl)-heptanoate and 2 ml. of 1,2-diethoxyethane is added to the mixture. The mixture thus obtained is stirred at room temperature for 1.5 hours. After adding ether, the reaction mixture is washed with water, dried and then evaporated to remove solvent. The residue thus obtained is introduced onto a silica-gel column, and the column is eluted with n-hexane-ethyl acetate (2:1). The eluate is evaporated to remove solvent. 0.136 g. of methyl 9,15-dioxo-13,14-didehydro(trans)-10 - oxa - prostanoate [the compound of the Formula I–A in which R¹ is methyl] is obtained as an oil.

Infrared absorption spectrum:

$\gamma_{max.}^{liq.}$ cm.⁻¹: 1780 (lactone), 1725 (ester), 1660, (=CO), 1620 (=C=C=), 980

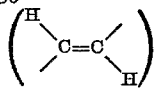

Nuclear magnetic resonance spectrum (in CDCl₃):

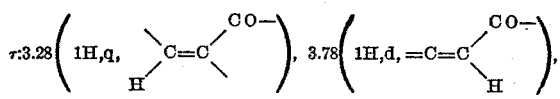

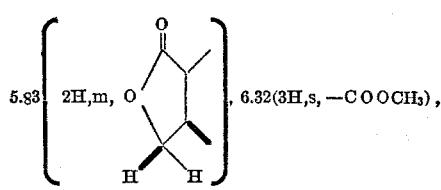

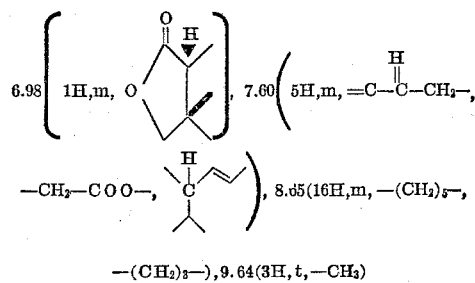

—(CH₂)₃—),9.64(3H,t,—CH₃)

Ultraviolet absorption spectrum:

$\lambda_{max.}^{ethanol}$ mμ: 224.5 (ε=15600)

Mass spectrum:

m/e: 354(M⁺)

EXAMPLE 5

A mixture of 0.386 g. of methyl 9,15-dioxo-13,14-didehydro(trans)-10-oxaprostanoate, 0.160 g. of 5% palladium-barium sulfate and 20 ml. of ethyl acetate is subjected to catalytic hydrogenation by introducing hydrogen gas into the mixture at room temperature under atmospheric pressure. After the reaction is completed, the catalysts are removed by filtration. The filtrate is evaporated to remove solvent. 0.385 g. of methyl 9,15-dioxo-10-oxaprostanoate [the compound of the Formula I–B in which R² is methyl] is obtained as an oil.

Infrared absorption spectrum:

$\gamma_{max.}^{liq.}$ cm.⁻¹: 1770 (lactone), 1725 (ester), 1703 (ketone)

Nuclear magnetic resonance spectrum (in CDCl₃): parent when 3,5 - dihydroxy - 3,5-dimethyl-dioxolane-1,2

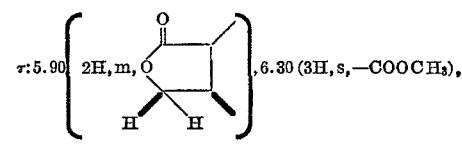

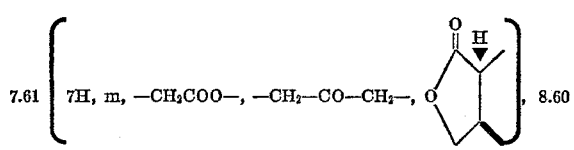

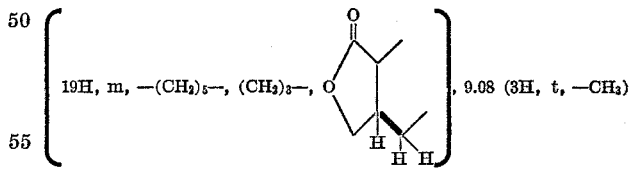

Mass spectrum:

m/e: 354(M⁺)

2,4-dinitrophenylhydrazone derivative of this product melts at 39° to 41° C.

EXAMPLE 6

0.044 g. of sodium borohydride is added to a mixture of 0.24 g. of methyl 9,15-dioxo-10-oxaprostanoate and 25 ml. of absolute methanol under water-cooling and stirring. The mixture is stirred at 0° C. for 15 minutes. Then, the mixture is poured into ice-water. After neutralizing with diluted hydrochloric acid, the aqueous mixture is extracted with ether. The ether extract is washed with water, dried and then evaporated to remove solvent. 0.191 g. of methyl 9-oxo-15-hydroxy-10-oxaprostanoate [the compound of the Formula I–C in which R² is methyl] is obtained as an oil. Infrared absorption spectrum:

$\gamma_{max.}^{liq.}$ cm.⁻¹: 3420 (hydroxy), 1770 (lactone), 1725 (ester)

Nuclear magnetic resonance spectrum (in CDCl₃):

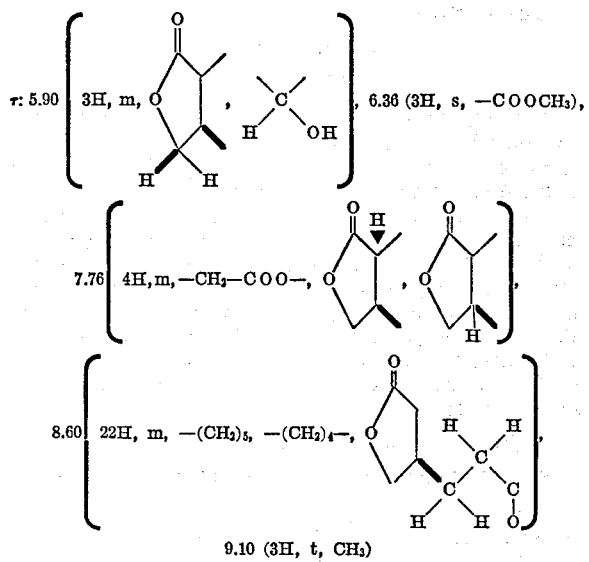

Mass spectrum:

m/e:356(M⁺)

EXAMPLE 7

0.228. g. of sodium borohydride is added to a mixture of 1.32 g. of methyl 9,15-dioxo-13,14-didehydro(trans)-10-oxaprostanoate and 60 ml. of absolute methanol under cooling and stirring. The mixture is stirred at −10° C. for 15 minutes. Then, the mixture is poured into ice-water. The aqueous mixture is neutralized with diluted hydrochloric acid. After adding ammonium sulfate, the aqueous mixture is extracted with ether. The ether extract is washed with water, dried and then evaporated to remove solvent. The oily residue thus obtained is purified by thin layer chromatography (solvent: n-hexane-ethyl acetate (1:1)). 0.313 g. of methyl 15(S)-hydroxy-9-oxo-13,14-didehydro(trans)-10-oxaprostanoate [the compound of the Formula I–D in which R² is methyl] and 0.525 g. of methyl 15(R)-hydroxy-9-oxo-13,14-didehydro(trans)-10 oxaprostanoate [the compound of the Formula I–D in which R² is methyl] are obtained.

Infrared absorption spectrum:

$\gamma_{max.}^{liq.}$ cm.⁻¹: 3380 (hydroxy), 1770 (lactone), 1720(ester), 980

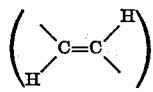

Nuclear magnetic resonance spectrum (in CDCl₃):

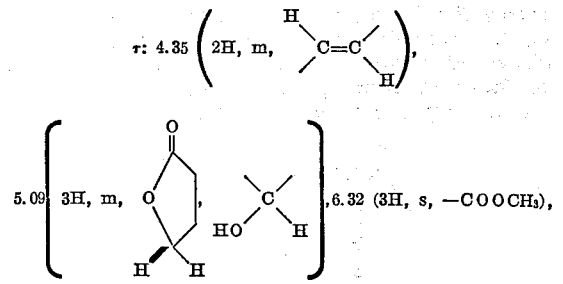

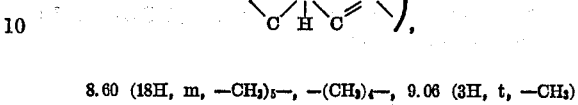

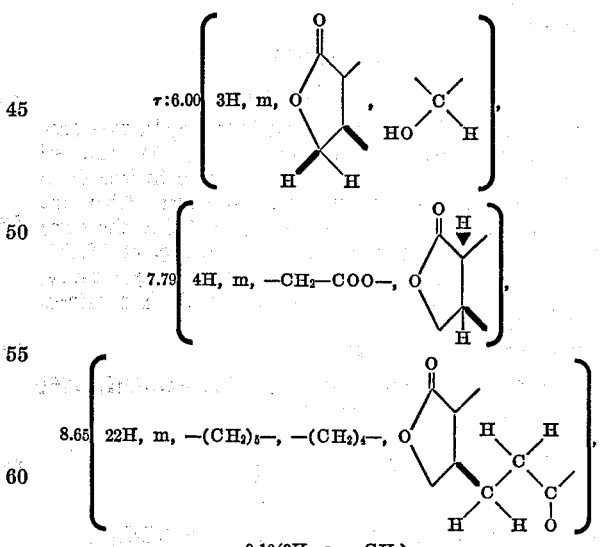

8.60 (18H, m, —CH₂)₅—, —(CH₂)₄—, 9.06 (3H, t, —CH₃)

Mass spectrum:

m/e:354(M⁺)

EXAMPLE 8

A mixture of 0.153 g. of methyl 15-hydroxy-9-oxo-10-oxaprostanoate, 10 ml. of methanol and 0.6 ml. of 20% potassium hydroxide is stirred at room temperature for 24 hours. After the reaction is completed, the mixture is neutralized with diluted hydrochloric acid and then evaporated under reduced pressure to remove methanol. The residue thus obtained is dissolved in water. The aqueous solution is acidified with diluted hydrochloric acid. Then, the aqueous solution is extracted with ether. An aqueous solution saturated with sodium bicarbonate is added to the ether extract, and the aqueous layer is separated. The aqueous layer is acidified with diluted hydrochloric acid, and again extracted with ether. The ether extract is washed with water, dried and then evaporated to remove solvent. The oily residue thus obtained is purified by thin layer chromatography (solvent: ethyl acetate). 0.083 g. of 15-hydroxy-9-oxo-10-oxaprostanoic acid [the compound of the Formula I–E] is obtained.

Infrared absorption spectrum:

$\gamma_{max.}^{liq.}$ cm.⁻¹: 3420 (hydroxy), 2800 (—COOH), 1770 (lactone), 1700 (=C—CO—O—)

Nuclear magnetic resonance spectrum (in CDCl₃):

9.10(3H, s, —CH₃)

Mass spectrum:

m/e: 342(M⁺)

EXAMPLE 9

A mixture of 0.120 g. of methyl 15(S)-hydroxy-9-oxo-13,14-didehydro(trans)-10-oxaprostanoate and 6 ml. of 20% potassium hydroxide-methanol is stirred at room temperature for 24 hours. After the reaction is completed, the mixture is treated in the same manner as described in Example 8, and the oily residue thus obtained is dissolved in a mixture of ethyl acetate and benzene. The solution is refluxed for 2 hours. Then, the solution is evaporated to remove solvent. The residue is purified by thin layer chromatography (solvent: ethyl acetate), and the crystals obtained is recrystallized from a mixture of ethanol and hexane. 0.032 g. of 15(S)-hydroxy-9-oxo-13,14-didehydro(trans)-10-oxaprostanoic acid [the compound of the Formula I–F] is obtained as needles. M.P. 60°–61° C.

Infrared absorption spectrum:

$\gamma_{max}^{liquid\ paraffin}$ cm.$^{-1}$: (hydroxy), 2800 (—COOH), 1760 (lactone), 1730 (ester), 980

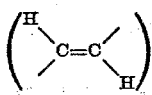

Nuclear magnetic resonance spectrum (in CDCl₃):

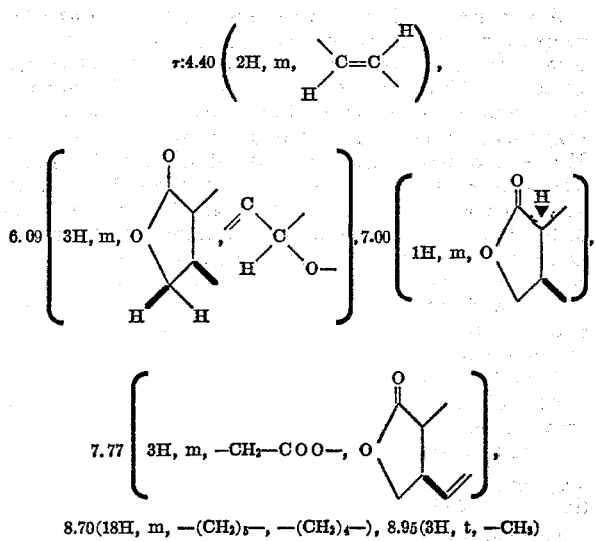

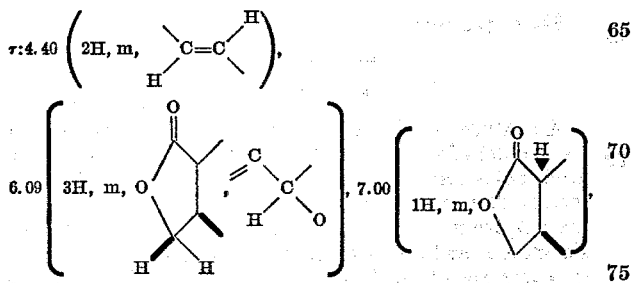

8.70(18H, m, —(CH₂)₅—, —(CH₂)₄—), 8.95(3H, t, —CH₃)

Mass spectrum:

m/e: 340(M⁺)

EXAMPLE 10

A mixture of 0.222 g. of methyl 15(R)-hydroxy-9-oxo-13,14-didehydro(trans)-10-oxaprostanoate, 15 ml. of methanol and one ml. of 20% potassium hydroxide is stirred at room temperature for 24 hours. After the reaction is completed, the mixture is treated in the same manner as described in Example 9. 0.153 g. of 15(R)-hydroxy - 9-oxo-13,14-didehydro(trans)-10-oxaprostanoic acid [the compound of the Formula I–F] is obtained. M.P. 93°–94° C.

Infrared absorption spectrum:

$\gamma_{max}^{liquid\ paraffin}$ cm.$^{-1}$: 3400 (hydroxy), 2800 (—COOH), 1760 (lacetone), 1730 (ester) 980

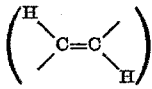

Nuclear magnetic resonance spectrum (in CDCl₃):

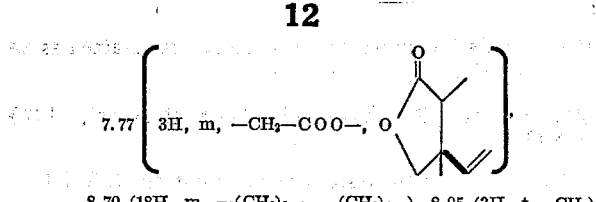

8.70 (18H, m, —(CH₂)₅—, —(CH₂)₄—), 8.95 (3H, t, —CH₃)

Mass spectrum:

m/e: 322(M⁺—18)

EXAMPLE 11

A mixture of 0.104 g. of methyl 15(R)-hydroxy-9-oxo-13,14-didehydro(trans)-10-oxaprostanoate, 0.4 ml. of propionic acid anhydride and 3 ml. of pyridine is allowed to stand at room temperature overnight.

The mixture is poured into ice-water, and the aqueous mixture is extracted with ether. The ether extract is washed with water, dried and then evaporated to remove solvent. The oily residue thus obtained is purified by thin layer chromatography (solvent: n-hexane-ethyl acetate (2:1)). 0.069 g. of methyl 15(R)-propionyloxy-9-oxo-13,14-didehydro(trans)-10-oxaprostanoate [the compound of the Formula I–G in which R¹ is ethyl and R² is methyl] is obtained.

$\gamma_{max}^{liquid\ paraffin}$ cm.$^{-1}$: 1770 (lactone), 1720 (ester)

Nuclear magnetic resonance spectrum (in CDCl₃):

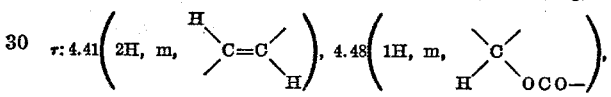

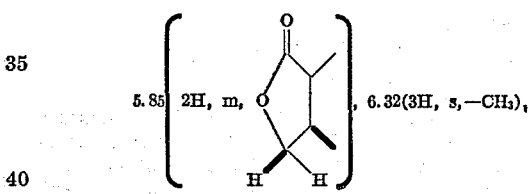

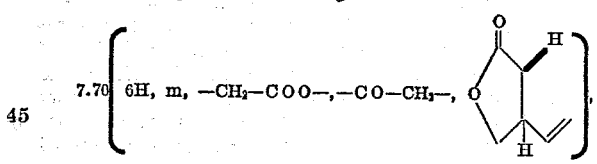

8.67 (18H, m, —(CH₂)₅—, —(CH₂)₄—),

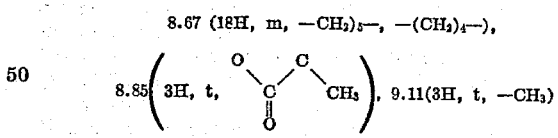

Mass spectrum:

m/e: 410(M⁺)

What we claim is:

1. A compound having the formula:

wherein R is hydrogen or lower alkyl, A is a radical having the formula: >CO, >CHOH or >CHOCOR¹, wherein R¹ is lower alkyl having 1–5 carbon atoms, and the dotted line is an optional double bond.

2. A compound having the formula:

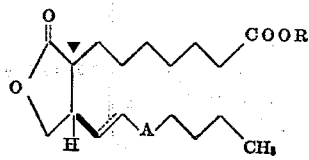

wherein R is hydrogen or methyl, A is a radical of the formula: >CHOH, and the dotted line is an optional double bond.

3. Methyl 9,15-dioxo-13,14-didehydro-10-oxaprostanoate.
4. Methyl 9,15-dioxo-10-oxaprostanoate.
5. Methyl 9-oxo-15-hydroxy-10-oxaprostanoate.
6. Methyl 15(S) - hydroxy - 9 - oxo-13,14-didehydro-10-oxaprostanoate.
7. Methyl 15(R) - hydroxy-9-oxo-13,14-didehydro-10-oxaprostanoate.
8. 15-hydroxy-9-oxo-10-oxaprostanoic acid.
9. 15(S) - hydroxy-9-oxo-13,14-didehydro-10-oxaprostanoic acid.
10. 15(R) - hydroxy - 9 - oxo-13,14-didehydro-10-oxaprostanoic acid.
11. Methyl 15 - propionyloxy - 9 - oxo-13,14-didehydro (trans)-10-oxaprostanoate.

References Cited

Taub et al.: A Stereoselective Total Synthesis of Prostoglandin E., Chemical Communications, 1970, pp. 1258–1259 relied on.

DONALD G. DAVIS, Primary Examiner

A. M. T. TIGHE, Assistant Examiner

U.S. Cl. X.R.

260—468 D, 485 H, 485 R, 514 D; 424—279